US011687949B2

(12) United States Patent
Ivanov (10) Patent No.: US 11,687,949 B2
(45) Date of Patent: Jun. 27, 2023

(54) SYSTEM AND METHOD OF DETECTING MASS HACKING ACTIVITIES DURING THE INTERACTION OF USERS WITH BANKING SERVICES

(71) Applicant: AO Kaspersky Lab, Moscow (RU)

(72) Inventor: Sergey N. Ivanov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 261 days.

(21) Appl. No.: 17/083,160

(22) Filed: Oct. 28, 2020

(65) Prior Publication Data

US 2021/0398146 A1 Dec. 23, 2021

(30) Foreign Application Priority Data

Jun. 19, 2020 (RU) .......................... RU2020120453

(51) Int. Cl.
*G06Q 30/00* (2023.01)
*G06Q 30/018* (2023.01)
*G06Q 30/0204* (2023.01)
*G06Q 40/02* (2023.01)
*H04L 9/40* (2022.01)
*H04L 67/50* (2022.01)
(Continued)

(52) U.S. Cl.
CPC ..... *G06Q 30/0185* (2013.01); *G06Q 30/0204* (2013.01); *G06Q 40/02* (2013.01); *H04L 63/1416* (2013.01); *H04L 63/1425* (2013.01); *H04L 63/1466* (2013.01); *H04L 67/535* (2022.05); *G06Q 20/108* (2013.01); *H04L 67/10* (2013.01)

(58) Field of Classification Search
CPC .......... G06Q 30/0185; G06Q 30/0204; G06Q 40/02; G06Q 20/108; H04L 67/535; H04L 63/1416; H04L 63/1425; H04L 63/1466; H04L 67/10
See application file for complete search history.

(56) References Cited

U.S. PATENT DOCUMENTS

2007/0174080 A1* 7/2007 Outwater ............. G06Q 20/108 705/42
2009/0049547 A1* 2/2009 Fan ..................... H04L 63/1425 726/22

(Continued)

*Primary Examiner* — Alvin L Brown
(74) *Attorney, Agent, or Firm* — ArentFox Schiff LLP; Michael Fainberg (57) ABSTRACT

An example of a method for detecting hacking activities includes identifying one or more attributes of each interaction in a sequence of interactions between one or more users and bank services during a predetermined time period. The one or more users are categorized into a plurality of groups based on the identified attributes. Each of the plurality of groups includes users performing the sequence of interactions with the bank services during the predetermined time period. A degree of anomaly is calculated for each of the plurality of groups based on a total number of users associated with a corresponding sequence of interactions and based on a number of users associated with the corresponding sequence of interactions during the predetermined time period. The calculated degree of anomaly is compared with a predetermined threshold. Hacking activity is identified, in response to determining that the calculated degree of anomaly exceeds the predetermined threshold.

18 Claims, 3 Drawing Sheets

(51) Int. Cl.
  *G06Q 20/10* (2012.01)
  *H04L 67/10* (2022.01)

(56) References Cited

U.S. PATENT DOCUMENTS

2015/0235152 A1* 8/2015 Eldardiry .............. G06F 21/552
                                                        705/7.28
2015/0324802 A1  11/2015 Kolkowitz et al.
2019/0132337 A1*  5/2019 Park .................... G06F 21/6263

* cited by examiner

SYSTEM AND METHOD OF DETECTING MASS HACKING ACTIVITIES DURING THE INTERACTION OF USERS WITH BANKING SERVICES

CROSS-REFERENCE TO RELATED APPLICATIONS

This application claims benefit of priority under 35 U.S.C. 119(a)-(d) to a Russian Patent Application No. 2020120453 filed on Jun. 19, 2020, which is incorporated by reference herein.

FIELD OF TECHNOLOGY

The invention relates to solutions for ensuring a secure interaction of users with banking services, and, more specifically, to systems and methods for detecting mass hacking activities during the interaction of users with banking services.

BACKGROUND

At present, the sphere of banking services has expanded significantly. New payment transfer methods for transferring funds from a payer to payee are often provided by banks. A great variety of transaction systems and providers of credit cards and bank services (the bank services being often called remote banking services) allow the user to perform a variety of financial transactions by means of computing devices. Online banking and mobile banking devices make it possible to perform a banking transaction without the use of a credit card or the information of a bank account.

Moreover, many mechanisms exist for protecting the funds of users against unsanctioned access to them by third parties. A two-factor authentication is often used when users access online banking services. This two-factor authentication requires users to enter authentication data (such as a login and password, which may have become accessible to third parties) in the browser on the bank site. In response to receiving users authentication data the bank typically sends a message to the user's mobile device containing, for example, an additional verification code which must be entered in a special field.

However, it should be noted that many hacker (fraud) attacks exist which may employ vulnerable aspects in the interaction of users with banking services and which may be carried out by malicious actors (hackers) for the purpose of gaining access to the funds of the users. For example, hackers can use phishing sites in an attempt to obtain users' authentication data for online banking. Malicious software (such as remote administration tools) may also allow hackers to steal authentication or sensitive data such as passwords, User-ID's, credit-card number and expiry dates, bank account and PIN numbers, smart-card data, biometric information, and the like. Such sensitive data may allow hackers to perform financial transactions unbeknownst to the users.

Techniques are known in which user devices are identified with so-called digital fingerprinting information in order to protect users against hacker activity. In the general case, banking software for connection to the bank server can maintain fingerprinting information associated with user's devices. In the event that the set of software on the device is changed, or the device itself is changed, there is a high probability that hacker activity is being observed. When hacker activity is performed on a device, the device is considered to be an untrusted device.

Numerous instances of various mass hacker-based threats (activity) are also known. Mass hacker activity enables hackers to perform the same actions in the name of the user repeatedly, where the performed actions are legitimate. The harmfulness of such hacker activity is in fact its mass nature. Oftentimes, mass hacker activity is carried out with the aid of automatic means (such as bots, which is short for "robots"). The mass hacker activity may be performed by means of web browsers from devices on which no means for counteracting hacker activity (such as antivirus applications) have been installed. The conventional hacker activity detection systems are not sufficiently effective, since they cannot identify mass hacker activity (for example, all the devices from which said mass hacker activity is being carried out).

Thus, there is a need to identify mass hacker activity during the interaction of users with banking services by means of a browser.

SUMMARY

Disclosed are systems and methods for detecting mass hacking activities.

Advantageously, the disclosed aspects identify mass hacking activity during the interaction of users with banking services by means of a cloud-based security service.

In one aspect, a method is proposed for detecting mass hacking activities, wherein the method involves steps in which: one or more attributes of each interaction in a sequence of interactions between one or more users and bank services during a predetermined time period are identified. The one or more users are categorized into a plurality of groups based on the identified attributes. Each of the plurality of groups includes users performing same sequence of interactions with the bank services during the predetermined time period. A degree of anomaly is calculated for each of the plurality of groups based on a total number of users associated with a corresponding sequence of interactions and based on a number of users associated with the corresponding sequence of interactions during the predetermined time period. The calculated degree of anomaly is compared with a predetermined threshold. Hacking activity is identified, in response to determining that the calculated degree of anomaly exceeds the predetermined threshold.

In one aspect, the one or more attributes include at least: an action to be performed by the user during the interaction with the bank services, a context of the action to be performed by the user during the interaction with the bank services.

In one aspect, the action to be performed by the user includes at least: user's navigation of a bank services website having a plurality of webpages, focusing on a navigational element of one of the plurality of webpages, entering data into one of the plurality of webpages, interacting with an interface element of one of the plurality of webpages.

In one aspect, the context of the action to be performed comprises at least: browser information identifying a browser employed by the user for the interaction with the bank services, application information identifying one or more applications interacting with the browser, device information identifying a device employed by the user for the interaction with the bank services.

In one aspect, categorizing the one or more users into the plurality of groups is performed by a cloud-computing service.

In one aspect, the degree of anomaly is calculated using a TF (Term Frequency)-IDF (Inverse Document Frequency) value.

In one aspect, detecting the hacking activity further includes comparing an observed interaction parameter value with a predetermined interaction parameter value.

In one aspect, the interaction parameter includes one or more of: a number of sessions established between the browser and a server providing the bank services during the predetermined time period, a number of sessions established between the browser and the server exhibiting a predetermined sequence of interactions, a speed of navigation in the browser, a speed/frequency of user input events, a number of unique users interacting with the bank services during the predetermined time period.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for detecting mass hacking activities. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
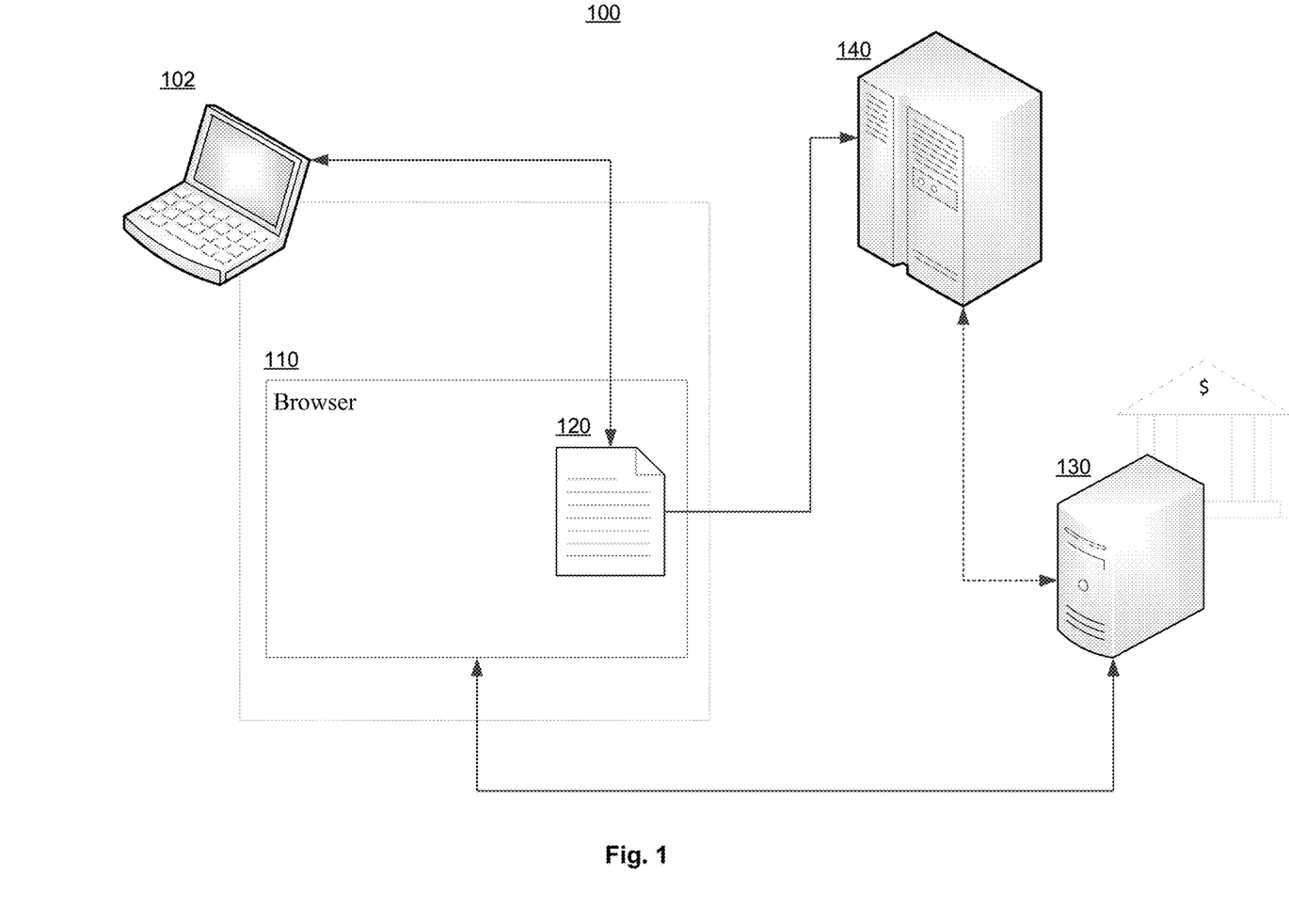
FIG. 1 shows a block diagram of an example of a system for detecting mass hacking activities.

FIG. 1 shows a block diagram of an example of a system for detecting mass hacking activities.

The system for detecting mass hacking activities 100 may include a web browser 110 (referred to hereinafter as "browser"), implemented on the user's computing device 102, a script 120, executed by the browser 110, a remote server 130, which provides banking services to the user, and with which the user interacts by means of the computing device 102, and a security service 140, with which the script 120 interacts.

The computing device 102 (hereinafter, the device 102) may contain a run time environment of the browser 110.

In the general case, during the interaction of users with a remote server 130 (by means of a browser 110 running on a computing device 102, the remote server 130 may send to the browser 110 a web page which may contain a script 120 (such as a script written in JavaScript language).

In a particular aspect, the remote server 130 may be, but is not limited to:
a bank server (that may be configured to provide services such as: payments, credits, loyalty programs);
a server of a microfinance organization (that may be configured to provide services such as: payments, credits);
a server of an online store (that may be configured to provide loyalty programs);
a server of a provider of telecommunication services (that may be configured to provide services such as: payments, loyalty programs);
a server of a logistical (transportation) company (that may be configured to provide services such as: payments, loyalty programs).

Microfinance is a provision of financial services such as loans, insurance, and so forth offered by different types of service providers for low-income clients. For simplicity of explanation, reference will be made below to "bank server" 130 even though other remote servers may be performing the functions.

In an aspect, the computing device 102 may execute the script 120 upon opening in the browser 110 the web page received from the bank server 130. The results of the execution of the script 120 may be sent to the security service 140, which may in turn analyze the received results.

In the general case, the interaction of the user with the bank server 130 may contain at least the following attributes of interaction (the attributes are described in greater detail below when with respect to the security service 140):
the action of the user to be performed at the time of the interaction;
the context of the action of the user to be performed at the time of the interaction.

The identification of the attributes of the interaction between the user and the bank server 130 may be performed by the script 120 executed as a result of opening in the browser 110 the web page received from the bank server 130.

In a particular aspect, the script 120 may identify at least the following actions of the user when working with the web page received from the bank server 130:
user's navigation of the bank services web site (i.e., the consecutive movement between web pages or elements of web pages by means of clicks, page scrolling, and the like);
the focusing on a navigational elements of a web page (i.e., user placing the mouse cursor on a given web page element or user focusing on a given web page element by means of the keyboard or some other input device associated with the computing device 102);
entering data into a web page (including the use of specialized interface elements, such as forms, entry fields, navigation panel, and so forth);
interacting with an interface element of a web page (i.e., pressing a mouse button, including double clicking, entering text from a keyboard or pressing individual keys on the keyboard, dragging an interface element, and the like).

In order to identify the context of the user's action to be performed when interacting with the bank server 130, the script 120 may be configured to gather at least one of the following information:
available browser information identifying a browser 110 employed by the user for the interaction with the bank services;
available application information identifying one or more applications interacting with the browser 110 (application information may be related to plugins or external applications);

available device information identifying a device employed by the user for the interaction with the bank services (such as the IP-address, information about the processor, and the like).

In an aspect, in response to opening the web page, the browser 110 may send the browser identification information and/or the device identification information to the bank server 130. This information may be part of the HTTP request string, beginning with "User-Agent", and usually including information such as the name of the browser 110, the version of the browser 110, information about the operating system of the computing device 102 (its name, version, and so forth), the language of the operating system of the computing device 102, and other similar information. The data containing the browser identification information and/or device identification information may be obtained by the script 120 or computed by the security service 140 on the basis of the information obtained by the script 120.

In an aspect, the script 120 may send the data related to the activity of the user to the security service 140. In the context of the present disclosure, the security service 140 may be a service whose resources are used entirely or partly for the remote detection of malicious programs and malicious activity on the basis of the received data. For example, the security service 140 may detect malicious activity based upon the aforementioned data related to the activity of the user. In an aspect, the security service 140 may be implemented as a cloud security service 140, such as the Kaspersky Security Network (hereinafter referred to as "cloud security service 140").

In an aspect, the present disclosure enables the detection of mass hacking activity by means of the cloud security service 140. The cloud security service 140 may be configured to detect anomalies in the activities of users based on historical data on the interaction of the users with the bank server 130. Inane aspect, the cloud security service 140 accumulates a historical context of interactions between the users and the bank server 140 in the process of its execution. In other words, the cloud security service 140 may collect user activity data on user activities already performed by the system 100.

As used herein, "an anomaly in the activities of the user" refers to an interaction between the user with the bank server 130 in a predetermined time period which differs from an expected interaction. In other words, an anomaly is an interaction that differs (with a high degree of certainty, e.g., at least 20% deviation) from an interaction corresponding to, or similar (e.g., within 90%-100%) to historically known interactions between the user and the bank server 130.

The technical problem of identifying an anomaly by the cloud security service 140 may be formulated in an aspect as the detection of mass anomalous activity in a given time window (predetermined time period) affecting a group of users unified by common attributes of interaction. The present disclosure makes it possible to identify both hacking activities being performed by automated means (such as bots) and activities being performed manually (without automation) either by a single person or a group in the name of various users. It should be noted that the size of the group of users associated with the anomaly may vary. In an aspect, to identify the anomalies, the cloud security service 140 may compare the attributes of the interactions of the users in the current time window with historical context of interactions between the users and the bank server 130. As the interaction attribute, the cloud security service 140 may use a value derived from all sessions of the users for which an attribute is computed and which can be compared with historical (expected) interactions data.

It should be noted that there may be several mass hacking activities that are unified by common attributes of interaction of anomaly. For example, the mass hacking activities may occur with the use of:

the same network location (IP-address, subnetwork, country, and so forth);
the same physical runtime environment (browser, OS, virtual device fingerprint);
the same script of user activities in the session (sequence of interactions of the user, such as data entry and navigation events).

In order to detect the mass hacking activity, the cloud security service 140 may be configured to utilize the attributes of interaction of anomaly to group all of the active sessions of the users in the current time window (i.e., predetermined time period). Furthermore, for each created group, the cloud security service 140 may calculate a degree of anomaly value. In an aspect, the cloud security service 140 may utilize the script of activities of the user (the sequence of interactions) in the session as the attribute of anomaly. It should be noted that mass hacking activity may occur from different devices 102, from different IP-addresses, different browsers 110 and operating systems, but the script of such mass hacking activities will concur.

For example, a large number of records may have been lost or stolen from a database of account records (say more than 10 thousand records). Hackers may first verify whether the database is valid, for example by using bots. For database verification purposes, they may verify the validity of the account records (using, for example, a botnet, the fingerprints of the devices 102 and the IP addresses being different). The first bot may execute the script (sequence of interactions) for user entry (login) and exit (logoff). A second bot, running concurrently, may use the validated account records to perform a script for further examination of user accounts or mail (for example, login, then move to a page with accounts or to the mailbox). A third bot may execute a script configured to transfer funds or stelae confidential data (login, funds transfer or sending of mail).

The script of user interactions in the session may contain at least two user activities which are not necessarily adjacent in time. In an aspect, the users are broken up by the cloud security service 140 into groups which have performed the identical script of interactions. In other words, each of the plurality of groups includes users performing same sequence of interactions with the bank services during the predetermined time period. Next, the cloud security service 140 may calculate the degree of anomaly for each group so obtained.

In one aspect, the cloud security service 140 may distinguish the scripts of activities in real time, when grouping and/or clustering the actions of the users. It should be noted that the tasks of categorizing and grouping of users by actions may be performed by the cloud security service 140 based on attributes of interaction by methods which are known in the art, and which go beyond the scope of the present disclosure.

In an aspect, the cloud security service 140 may use the TF-IDF (TF—term frequency, IDF—inverse document frequency) attribute of anomaly to calculate the degree of anomaly. Generally, the TF-IDF is a statistical measure used to assess the importance of a word in the context of a document (such as a web page) which is part of a collection of documents or a corpus of documents. The weight of a particular word is proportional to the frequency of use of that word in the document and inversely proportional to the frequency of use of the word in all the documents of the collection. In the context of the present disclosure, the cloud security service 140 may utilize the users in the place of the documents, and the values of the common attributes of anomaly in the place of the words, when calculating the TF-IDF value.

An example of the calculation of the degree of anomaly is given below. For illustrative purpose only assume:

$\Delta t$ represents the predetermined time window (time period) for calculating the anomaly;

U represents the set of all users;

N=/U/ represents the total number of users;

s represents the session of the user;

$U^{\Delta t}=\{u \in U : \exists s | s \in u \wedge s \in \Delta t\}$ represents the set of all users having sessions in the time window (for example, 11 sessions in 30 minutes);

$N^{\Delta t}=|U^{\Delta t}|$ represents the number of users in the time window (for example, 2 users in 30 minutes);

a represents the value of the common attribute, in an aspect—the specific script of user's interactions;

$t_a$ represents the lifetime of the value of the attribute (the period from its first appearance in the sequence of observed events to the moment of time when the degree of anomaly value is calculated);

$\Delta U$ represents the portion of new users. The new users are users who have been identified first in the given time period $\Delta t$, while the portion of the new users is the percentage of the new users with respect to the entire set of all users at the beginning of the time period In other words, for example, if there were 1000 users at the beginning of the month, and 100 new users were identified in the course of the month (predetermined time period), then the portion of new users is accordingly 10%.

$U_a=\{u \in U : a \in u\}$ represents the set of users associated with the value of the attribute;

$N_a=|U_a|$ represents the number of users associated with the attribute;

$U_a^{\Delta t}$ represents the set of users with a given value of the attribute in the predetermined time period;

$N_a^{\Delta t}=|U_a^{\Delta t}|$ is a numerical value representing the number of users associated with the value of the attribute in the predetermine time period;

$$T_a^{\Delta t} = \frac{max(t_a, \Delta t)}{\Delta t}$$

represents the number of time periods over the lifetime of the value of the attribute.

In an aspect, the expected number of users for a predetermined time period may be calculated by the following formula (1):

$$F_a^{\Delta t} = \left[ \frac{N_a}{1 + \Delta U \times (T_a^{\Delta t} - 1)} \right] \quad (1)$$

The significance of the attribute may be calculated by the following formula (2):

$$idf(a, U) = \log \frac{N}{N_a} \quad (2)$$

The degree of anomaly may be calculated by the following formula (3):

$$S_a^{\Delta t} = \begin{cases} \frac{idf(a, U) \times N_a^{\Delta t}}{F_a^{\Delta t}} & \text{if } N_a^{\Delta t} > F_a^{\Delta t} \\ 0.0 & \text{otherwise} \end{cases} \quad (3)$$

In an aspect, the cloud security service 140 may compare the degree of anomaly value calculated by the formula (3) above with a threshold value. In response to determining that the calculated degree of anomaly exceeds the predetermined threshold, the security service 140 identifies a mass hacking activity. If the degree of anomaly exceeds the threshold, there is a high degree of probability that the identified activity is fraudulent, since a mass anomalous nature of performance of a particular script by a user when interacting with a bank server 130 may mean that hacking activity is being carried out. As a result, the cloud security service 140 may send information about the identified hacking activity to the bank server 130 for further investigation of the possible hacking incident.

In another aspect, the cloud security service 140 may use the data obtained from the script 120 to identify anomalies based on various observed interaction parameters. It should be noted that the cloud security service 140 may determine the presence of an anomaly, for example, by comparing the value of a particular observed interaction parameter obtained from the script 120 with a known (expected, historical) value of that interaction parameter. The interaction parameter may be calculated by the cloud security service 140 on the basis of the attributes of the interaction of the user when interacting with the bank service 130.

Examples of interaction parameters using which the cloud security service 140 may identify anomalies in the interaction of a user with a bank server 130 include, but are not limited to:
- the number of sessions established between the browser 110 and the bank server 130 during the predetermined time period;
- the number of sessions established between the browser 110 and the bank server 130 exhibiting a predetermined sequence of interactions (that is, sessions with corresponding or similar sequence of actions of the user);
- the speed of navigation in the browser 110 (as a result of the aforementioned actions of the user as identified by the script 120) in the session of the user;
- the speed/frequency of input events (as a result of the aforementioned actions of the user as identified by the script 120);
- the number of unique users interacting with the bank server 130, during the predetermined time period.

Figure 2:
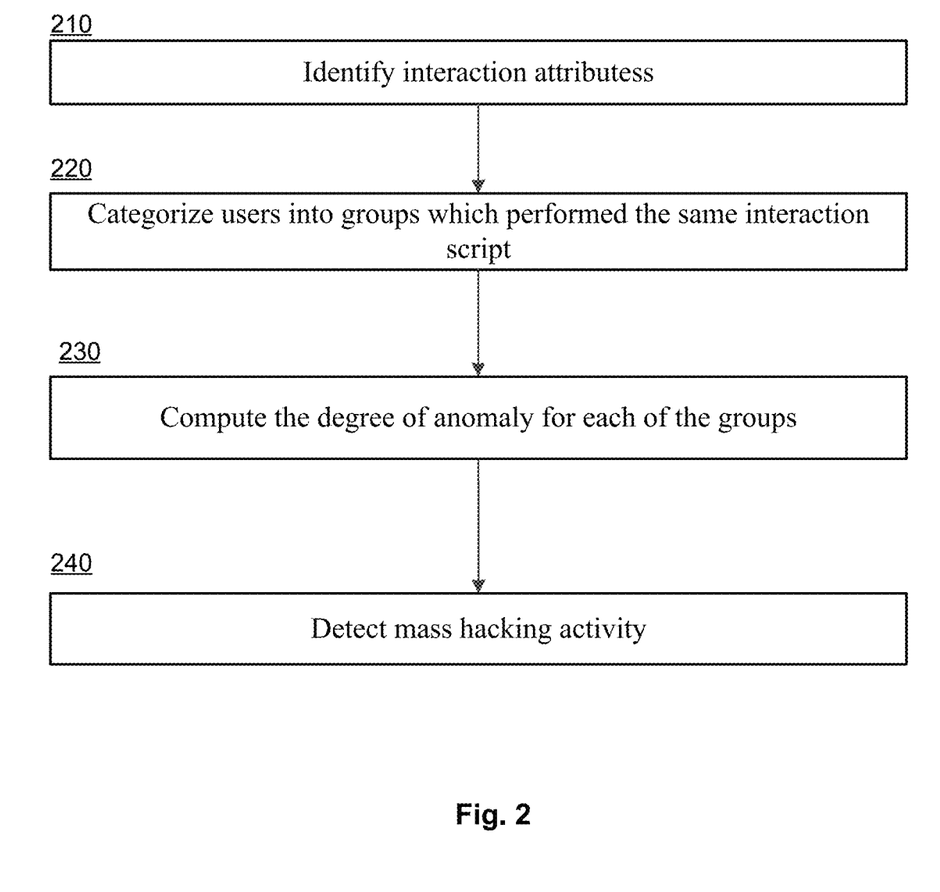
FIG. 2 illustrates an example of a method for detecting mass hacking activities.

FIG. 2 illustrates a method for detecting hacking activities, in accordance with aspects of the present disclosure.

At step 210, the script 120 executed as a result of opening in the browser 110 the web page received from the bank server 130 may identify the attributes of the interaction of the users interacting with the bank services 130 during a predetermined time period.

In an aspect, users' interaction with the bank server 130 may contain at least the following attributes of interaction:
- the action to be performed by the user during the interaction with the bank server 130;
- the context of the action to be performed by the user during the interaction with the bank server 130.

Furthermore, at step 210 the script 120 may send the results of its execution (the identified attributes of interaction) to the security service 140, which in turn may analyze the received results.

At step 220, the security service 140 may be used to identify the interactions of each user corresponding to a particular script (sequence of user interactions), based on the identified attributes of the users' interactions. In an aspect, the security service 140 may be implemented as a cloud security service. In the general case, the script of users interactions in a session may contain at least two user activities, not necessarily adjacent in time. Thus, at step 220, the security service 140 may group the users interacting with the bank server 130 into groups which have performed the same script of interactions. In other words, each of the generated groups includes users performing same sequence of interactions with the bank services during the predetermined time period.

At step 230, the security service 140 may calculate the degree of anomaly for each group based on the number of all users associated with the corresponding sequence of interactions, and based on the number of users associated with the corresponding sequence of interactions during the predetermined time period. In one aspect, the security service 140 may calculate the degree of anomaly using the statistical measure TF-IDF, which is typically used to assess the importance of a word in the context of a document. For purposes of this calculation, the security service 140 may use the users instead of the documents in the conventional calculations, and may use the script of user interactions instead of the words in the conventional calculations approach. A detailed example of the calculation of the degree of anomaly is explained above in conjunction with FIG. 1. For purposes of this calculation, the security service 140 may use the users instead of the documents in the conventional calculations, and may use the script of user interactions instead of the words in the conventional calculations approach. A detailed example of the calculation of the degree of anomaly is explained above in conjunction with FIG. 1.

Figure 3:
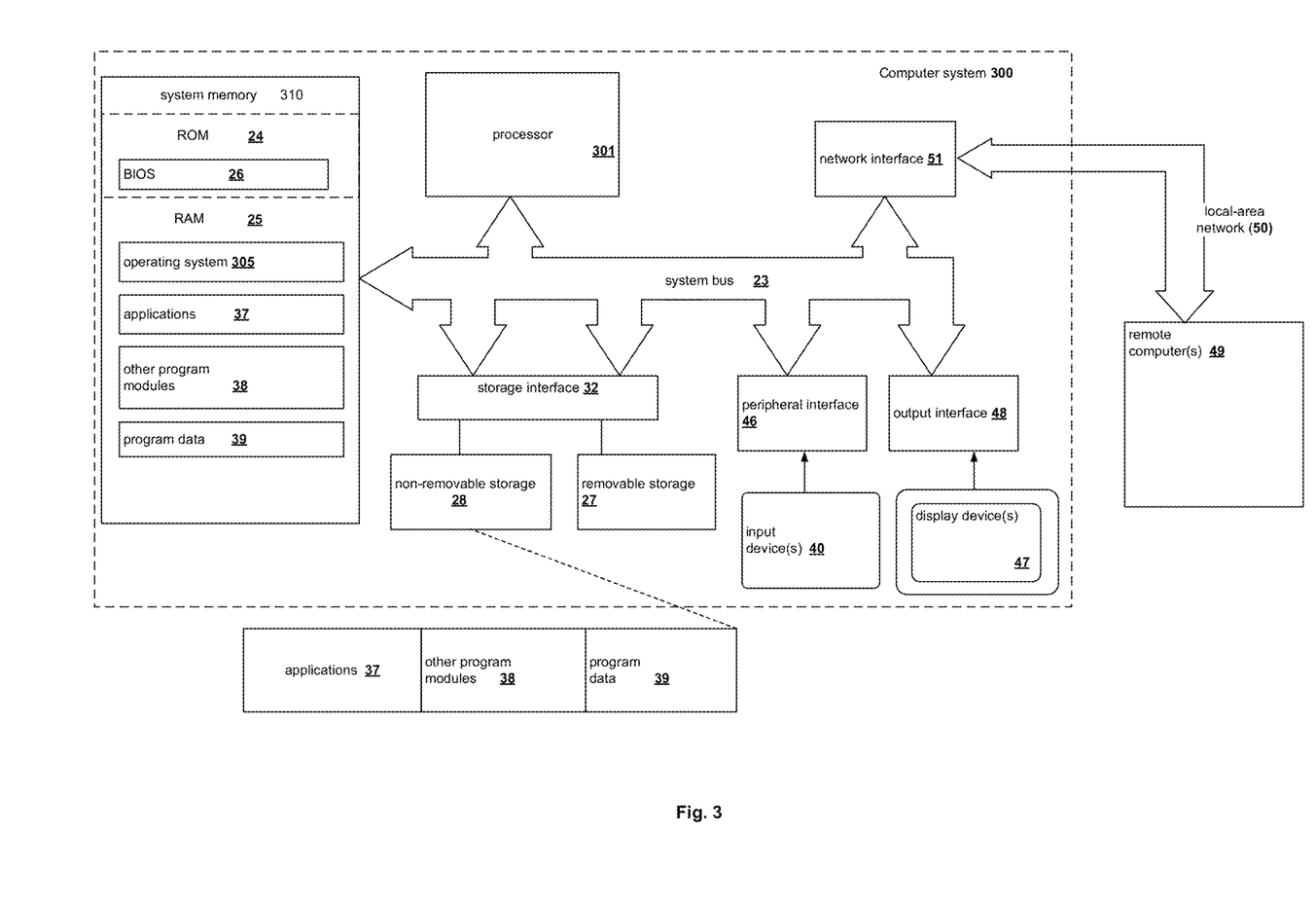
FIG. 3 shows an example of a computer system on which variant aspects of systems and methods disclosed herein may be implemented.

At step 240, the security service 140 may identify a hacking activity in response to determining that the degree of anomaly value exceeds a predetermined threshold value. If the degree of anomaly exceeds the threshold, there is a high degree of probability that the identified activity is fraudulent, since a mass anomalous nature of performance of a particular script by a user when interacting with a bank server 130 may mean that hacking activity is being carried out. As a result, the cloud security service 140 may send information about the identified hacking activity to the bank server 130 for further investigation of the possible hacking incident FIG. 3 is a block diagram illustrating a computer system 300 on which aspects of systems and methods for detecting mass hacking activities may be implemented in accordance with an exemplary aspect. The computer system 300 may represent the computer system 100 of FIG. 1 containing the computing device 102 and the security service 140 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 300 includes a central processing unit (CPU) 301, a system memory 310, and a system bus 23 connecting the various system components, including the memory associated with the central processing unit 301. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 301 (also referred to as a processor) can include a single or multiple sets of processors having single or multiple cores. The processor 301 may execute one or more computer-executable code implementing the techniques of the present disclosure. The system memory 310 may be any memory for storing data used herein and/or computer programs that are executable by the processor 301. The system memory 310 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 300, such as those at the time of loading the operating system with the use of the ROM 24.

The computer system 300 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 300. The system memory 310, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 300.

The system memory 310, removable storage devices 27, and non-removable storage devices 28 of the computer system 300 may be used to store an operating system 305, additional program applications 37, other program modules 38, and program data 39. The computer system 300 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 300 may be equipped with other peripheral output devices (not shown), such as loudspeakers and other audiovisual devices.

The computer system 300 may operate in a network environment, using a network connection to one or more remote computers 49. The remote computer (or computers)

49 may be local computer workstations or servers comprising most or all of the aforementioned elements in describing the nature of a computer system 300. Other devices may also be present in the computer network, such as, but not limited to, routers, network stations, peer devices or other network nodes. The computer system 300 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 300. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:
1. A method for detecting hacking activities, the method comprising:
 identifying one or more attributes of each interaction in a sequence of interactions between one or more users and bank services during a predetermined time period;

categorizing, by a cloud-computing service, the one or more users into a plurality of groups based on the identified attributes, wherein each of the plurality of groups includes users performing identical sequence of interactions with the bank services during the predetermined time period;

calculating a degree of anomaly for each of the plurality of groups based on a total number of users associated with a corresponding sequence of interactions and a number of users associated with the corresponding sequence of interactions during the predetermined time period;

comparing the calculated degree of anomaly with a predetermined threshold; and detecting hacking activity in response to determining that the calculated degree of anomaly exceeds the predetermined threshold, wherein the detecting of the hacking activity comprises comparing a value of an interaction parameter that is observed with a value of the interaction parameter that is predetermined, and wherein the interaction parameter comprises one or more of: a number of sessions established between a browser and a server providing the bank services during the predetermined time period, and a number of sessions established between the browser and the server exhibiting a predetermined sequence of interactions.

2. The method of claim 1, wherein the one or more attributes comprise at least: an action to be performed by the user during the interaction with the bank services, a context of the action to be performed by the user during the interaction with the bank services.

3. The method of claim 2, wherein the action to be performed by the user comprises at least: user's navigation of a bank services website having a plurality of webpages, focusing on a navigational element of one of the plurality of webpages, entering data into one of the plurality of webpages, interacting with an interface element of one of the plurality of webpages.

4. The method of claim 2, wherein the context of the action to be performed comprises at least: browser information identifying the browser employed by the user for the interaction with the bank services, application information identifying one or more applications interacting with the browser, device information identifying a device employed by the user for the interaction with the bank services.

5. The method of claim 1, wherein the degree of anomaly is calculated using a TF (Term Frequency)-IDF (Inverse Document Frequency) value.

6. The method of claim 1, wherein the interaction parameter further comprises one or more of: a speed of navigation in the browser, a speed/frequency of user input events, a number of unique users interacting with the bank services during the predetermined time period.

7. A system for detecting hacking activities, the system comprising:
a hardware processor configured to:
identify one or more attributes of each interaction in a sequence of interactions between one or more users and bank services during a predetermined time period;
categorize, by a cloud-computing service, the one or more users into a plurality of groups based on the identified attributes, wherein each of the plurality of groups includes users performing identical sequence of interactions with the bank services during the predetermined time period;
calculate a degree of anomaly for each of the plurality of groups based on a total number of users associated with a corresponding sequence of interactions and a number of users associated with the corresponding sequence of interactions during the predetermined time period;
compare the calculated degree of anomaly with a predetermined threshold; and
detect hacking activity in response to determining that the calculated degree of anomaly exceeds the predetermined threshold,
wherein the detecting of the hacking activity comprises comparing a value of an interaction parameter that is observed with a value of the interaction parameter that is predetermined, and
wherein the interaction parameter comprises one or more of: a number of sessions established between a browser and a server providing the bank services during the predetermined time period, and a number of sessions established between the browser and the server exhibiting a predetermined sequence of interactions.

8. The system of claim 7, wherein the one or more attributes comprise at least: an action to be performed by the user during the interaction with the bank services, a context of the action to be performed by the user during the interaction with the bank services.

9. The system of claim 8, wherein the action to be performed by the user comprises at least: user's navigation of a bank services website having a plurality of webpages, focusing on a navigational element of one of the plurality of webpages, entering data into one of the plurality of webpages, interacting with an interface element of one of the plurality of webpages.

10. The system of claim 8, wherein the context of the action to be performed comprises at least: browser information identifying the browser employed by the user for the interaction with the bank services, application information identifying one or more applications interacting with the browser, device information identifying a device employed by the user for the interaction with the bank services.

11. The system of claim 7, wherein the degree of anomaly is calculated using a TF (Term Frequency)-IDF (Inverse Document Frequency) value.

12. The system of claim 7, wherein the interaction parameter further comprises one or more of: a speed of navigation in the browser, a speed/frequency of user input events, a number of unique users interacting with the bank services during the predetermined time period.

13. A non-transitory computer readable medium storing thereon computer executable instructions for detecting hacking activities, including instructions for:
identifying one or more attributes of each interaction in a sequence of interactions between one or more users and bank services during a predetermined time period;
categorizing, by a cloud-computing service, the one or more users into a plurality of groups based on the identified attributes, wherein each of the plurality of groups includes users performing identical sequence of interactions with the bank services during the predetermined time period;
calculating a degree of anomaly for each of the plurality of groups based on a total number of users associated with a corresponding sequence of interactions and a number of users associated with the corresponding sequence of interactions during the predetermined time period;

comparing the calculated degree of anomaly with a predetermined threshold; and detecting hacking activity in response to determining that the calculated degree of anomaly exceeds the predetermined threshold, wherein the detecting of the hacking activity comprises comparing a value of an interaction parameter that is observed with a value of the interaction parameter that is predetermined, and wherein the interaction parameter comprises one or more of: a number of sessions established between a browser and a server providing the bank services during the predetermined time period, and a number of sessions established between the browser and the server exhibiting a predetermined sequence of interactions.

14. The non-transitory computer readable medium of claim 13, wherein the one or more attributes comprise at least: an action to be performed by the user during the interaction with the bank services, a context of the action to be performed by the user during the interaction with the bank services.

15. The non-transitory computer readable medium of claim 14, wherein the action to be performed by the user comprises at least: user's navigation of a bank services website having a plurality of webpages, focusing on a navigational element of one of the plurality of webpages, entering data into one of the plurality of webpages, interacting with an interface element of one of the plurality of webpages.

16. The non-transitory computer readable medium of claim 14, wherein the context of the action to be performed comprises at least: browser information identifying the browser employed by the user for the interaction with the bank services, application information identifying one or more applications interacting with the browser, device information identifying a device employed by the user for the interaction with the bank services.

17. The non-transitory computer readable medium of claim 13, wherein the degree of anomaly is calculated using a TF (Term Frequency)-IDF (Inverse Document Frequency) value.

18. The non-transitory computer readable medium of claim 13, wherein the interaction parameter further comprises one or more of: a speed of navigation in the browser, a speed/frequency of user input events, a number of unique users interacting with the bank services during the predetermined time period.

* * * * *